Sept. 12, 1967 D. A. GORSKI 3,341,361
PROCESS FOR PROVIDING A SILICON SHEET
Filed Feb. 21, 1963
A PROCESS FOR PRODUCING A SILICON SHEET
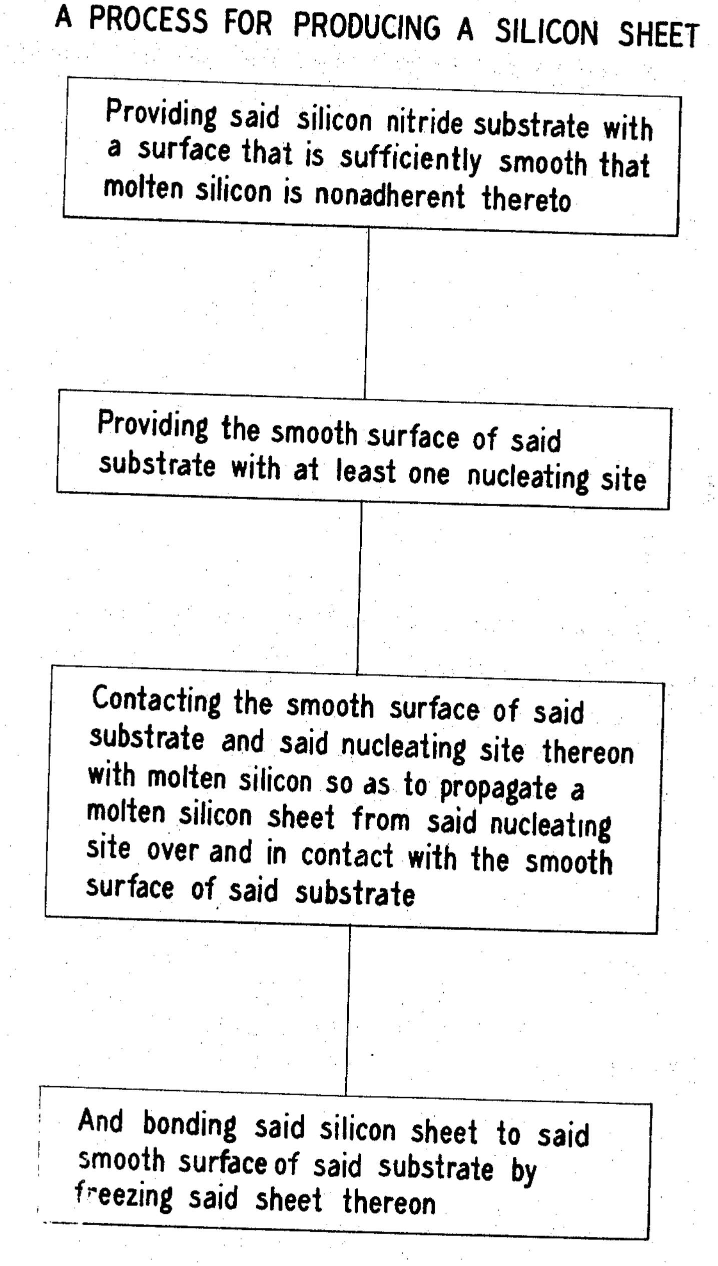
INVENTORS
DANIEL A. GORSKI
BY Leo A. Plum, Jr.
ATTORNEY 3,341,361

PROCESS FOR PROVIDING A SILICON SHEET

Daniel A. Gorski, Middleburgh Heights, Cleveland, Ohio, assignor to Union Carbide Corporation, a corporation of New York Filed Feb. 21, 1963, Ser. No. 260,287
8 Claims. (Cl. 117—213)

This invention relates generally to semiconductor articles and, more particularly, to the production of sheets of relatively large silicon crystals bonded to a foreign substrate.

Heretofore, a number of processes have been proposed for bonding thin silicon sheets to foreign substrates. For example, one known process for producing such articles is to evaporate the silicon onto the foreign substrate. However, evaporating processes are extremely slow and are often difficult to control. Silicon sheets can also be deposited on many substrate materials by the thermal decomposition of various gases, such as silane or, more commonly, trichlorosilane. However, silane tends to decompose by a gas phase reaction which produces a spongy or powdery deposit of silicon. Trichlorosilane does not usually decompose by the gas phase reaction, but since it contains a halogen, its decomposition involves troublesome reversible reactions. Another major shortcoming of each of the aforedescribed processes is that the size of the crystals in the deposited silicon usually depends on the crystalline structure of the substrate. Thus, when the substrate has a polycrystalline structure with very small crystals, the crystals in the deposited silicon sheet are generally of about the same size or smaller than those in the substrate, and no large area silicon crystals can be produced. This is obviously undesirable in view of the fact that most semiconductor applications require that the silicon crystals be relatively large.

It is, therefore, the main object of the present invention to provide an improved process for forming a silicon sheet bonded to a foreign substrate.

It is another object to provide such a process which is relatively rapid and which does not involve gas phase or reversible reactions.

It is a further object to provide a process for producing a sheet of relatively large silicon crystals bonded to a polycrystalline substrate.

Another object is to provide a semiconductor article comprising a sheet of relatively large silicon crystals bonded to a foreign substrate.

A further object is to provide such an article wherein the substrate has good insulating properties and a coefficient of thermal expansion close to that of the silicon sheet.

Other aims and advantages of the invention will be apparent from the following description and appended claims.

In accordance with the present invention, there is provided a semiconductor article comprising a sheet of large silicon crystals bonded to a silicon nitride substrate. This article is produced by providing the silicon nitride substrate with a surface that is sufficiently smooth that molten silicon is non-adherent thereto, providing the smooth surface of the substrate with at least one nucleating site, contacting the smooth surface of the silicon nitride substrate and the nucleating site thereon with molten silicon so as to propagate a molten silicon sheet from the nucleating site over and in contact with the smooth surface of the substrate, and bonding the silicon sheet to the smooth surface of the substrate by freezing the sheet thereon.

The drawing is a chart illustrating the steps involved.

This invention stems from the discovery that silicon nitride, which has a coefficient of thermal expansion very close to that of silicon, can be provided with a surface to which silicon will not adhere when molten, but to which the silicon becomes firmly bonded when the molten silicon is frozen. In other words, the surface of the silicon nitride is not wetted by molten silicon, and yet when the molten silicon is frozen in contact with the nitride surface, the silicon sheet becomes firmly bonded thereto. As a result of this phenomenon, the silicon nitride substrate can be dipped into a body of molten silicon without being wetted by the molten silicon, i.e., the molten silicon does not adhere to the nitride surface. Surprisingly, however, when the silicon nitride with a nucleating site is withdrawn from the silicon melt so as to draw a silicon sheet from the melt over the non-wetted nitride surface, the silicon sheet becomes firmly bonded to the silicon nitride as it is frozen thereon.

The silicon nitride substrate not only permits the drawing of large crystals thereover because of its non-wettability, but also offers other desirable properties as a substrate for silicon. For example, silicon nitride has good insulating properties and low thermal conductivity. The low thermal conductivity is especially important in the inventive process because it causes the drawn silicon sheet to freeze from its outside surface inwardly toward the surface of the nitride substrate, thus further enhancing the growth of large silicon crystals. Also, silicon nitride has a coefficient of thermal expansion very close to that of silicon at the temperatures normally encountered both in crystal pulling and in electronic circuit applications.

The silicon nitride substrate must be initially provided with a surface which is sufficiently smooth that molten silicon is non-adherent thereto. The smooth nitride surface can be prepared by a number of different methods. For example, slip casting of dense silicon nitride articles produces a sufficiently smooth surface without any further mechanical or chemical treatment. Alternatively, the smooth surface may be attained by polishing with a relatively fine polishing paper, by etching with hydrofluoric acid or other etching agents, or by any other suitable method.

The main requirement for the silicon nitride surface is that it be sufficiently smooth that molten silicon will not adhere thereto, i.e., that molten silicon will not wet the nitride surface. The surface of the nitride substrate must also be chemically clean, i.e., free of oxides and other materials which could contaminate the silicon. A simple test for determining when the required degree of smoothness has been achieved on the silicon nitride substrate is to dip a portion of the substrate which is free of nucleation sites into molten silicon. When the substrate is withdrawn from the molten silicon, it should be free of adhering molten silicon.

It is not necessary that all the surfaces of the silicon nitride substrate be made non-wettable by molten silicon. Even though one surface of the substrate is wetted by the molten silicon, this does not prevent the growing of large silicon crystals on another surface which is non-wettable. Also, the subject invention is not limited to any particular substrate shape. The silicon nitride may be in the form of a flat plate, a cylinder, irregular or curved shapes, or any other desired shape which can be provided with a sufficiently smooth surface.

Before the silicon nitride substrate is dipped into the molten silicon for the pulling operation, the smooth surface of the substrate must be provided with at least one nucleation site from which silicon crystals can propagate to form the silicon sheet. These nucleation sites can be provided in a number of different ways. For example, nucleation sites may be provided on the smooth substrate surface by simply making one or more small rough spots thereon, such as by making machine cuts or nicks. The same effect can be achieved by introducing small amounts of foreign particles into the smooth substrate surface, as by embedding silicon carbide particles therein. In one embodiment, two roughened areas or particles are provided at opposite sides of the smooth nitride surface so that molten silicon is drawn up between the nucleating sites by surface tension. In a preferred embodiment, the nucleation sites are provided by single crystal silicon seeds which are mounted on the edges of the smooth surface of the silicon nitride substrate.

After the silicon nitride substrate has been provided with a sufficiently smooth surface so that it cannot be wetted by molten silicon, the substrate with one or more nucleating sites is dipped into a bath of molten silicon and then slowly withdrawn therefrom so as to pull a thin silicon sheet over the substrate surface. Both the thickness of the silicon sheet and the size of the silicon crystals therein are determined mainly by two interdependent factors, namely, the temperature of the silicon melt and the rate at which the silicon sheet is pulled therefrom. The way in which the melt temperature and pulling rate are adjusted depends somewhat on the particular pulling technique employed. In modified Czochralski techniques, such as described in Metallurgy of Elemental and Compound Semiconductors (ed. R. O. Grubel), page 201, Interscience Published, New York, 1961, silicon seeds are used to pull monocrystalline silicon sheets from a melt held above the melting point, and growth occurs at the interface between the silicon seed (or the end of the growing sheet) and the surface of the melt. As is well known, the thermal control in such methods is especially critical if uniformity of sheet thickness and width are desired.

Another pulling technique which can be used to pull the silicon more rapidly than in the modified Czochrolski methods, is known as "dendritic growth" (see 116 Phys. Rev. 53, 1959). In the dendritic growth technique, the silicon sheet is pulled from a supercooled silicon melt, and most of the growth takes place beneath the surface of the melt. In another recently proposed method for pulling silicon sheets, two spaced apart dendrites are withdrawn from a supercooled silicon melt in such a way that a sheet of silicon grows between the two dendrites. This method is described in detail in Electrochemical Society, Electronics Division, Abstracts, volume 2, No. 1, pp. 123–125 (1962). When this method is employed in the present invention, the two dendrites are mounted on opposite edges of the smooth substrate surface. The substrate and the ends of the dendrites are then dipped into the molten silicon, the temperature of the melt is adjusted to propagate crystals from the ends of the dendrites, and the substrate and the dendrites are then withdrawn so as to pull a molten silicon sheet over the smooth substrate surface. As the substrate and dendrites are pulled upward, molten silicon is drawn up by surface tension, the height of the freezing interface depending on the pull rate and the temperature of the melt. While the edge dendrites grow below the melt surface as in dendritic growth, the sheet grows above the normal surface of the melt. The melt temperature and the pull rate also determine the sheet thickness and the size of the silicon crystals therein. Since these various sheet growing techniques are already well known in the semiconductor art, they will not be described in detail herein.

Since it is often difficult to measure the exact temperature of a silicon melt, it is generally preferred to determine the required melt temperature empirically. In one such method, the silicon is initially completely melted, and the melt is held at a temperature above the melting point of silicon while a smooth-surfaced silicon nitride substrate having a nucleation site thereon is dipped into and withdrawn from the melt. If no silicon crystals are propagated from the nucleation site, the melt is too hot and must be cooled slightly. If the melt surface freezes, the melt temperature is too low and must be increased slightly.

As the silicon nitride substrate is withdrawn from the silicon melt and the molten silicon sheet pulled thereover, the silicon sheet is cooled by the surrounding atmosphere, which must be at a temperature below the melting point of silicon. As the silicon sheet is cooled, it solidifies or freezes on the smooth substrate surface and becomes firmly bonded thereto. The resulting semiconductor article comprises a sheet of large area silicon crystals bonded to a ceramic silicon nitride substrate. The drawn silicon sheet generally has a smooth surface as formed, and thus does not require supplemental polishing treatment. The interface bond between the silicon nitride substrate and the silicon sheet is at least as strong as the silicon nitride or silicon alone, i.e., the silicon-silicon nitride bond is at least as strong as the silicon-silicon or silicon nitride-silicon nitride bond. Thus, attempts to break the silicon sheet away from the silicon nitride substrate usually result in a break in the substrate or in the sheet rather than at the interface. The inventive article is useful in both active and passive electronic devices.

In an example of the present invention, a slip cast flat plate of silicon nitride ⅛ inch thick, ¼ inch wide, and 1½ inches long and having a density of 70% of the theoretical density of silicon nitride was used as the substrate. The flat surfaces of the silicon nitride plate were polished with size 800 grit on a polishing wheel, ultrasonically rinsed in distilled water, and then polished with abrasive having a nominal grit size of about 3 microns. The plate was then etched for 2 minutes in concentrated hydrofluoric acid and 2 minutes in a mixture of 50% concentrated hydrofluoric acid and 50% concentrated nitric acid, rinsed in distilled water, and air dried. The resulting plate surfaces were sufficiently smooth that the plate could be dipped into and withdrawn from molten silicon at a temperature of 1425° C. without any silicon adhering to the plate surfaces.

A monocrystalline silicon seed ⅛ inch thick, ¼ inch wide, and 1 inch long was then placed on one of the smooth flat surfaces of the silicon nitride plate, and both the plate and the seed were attached to the sample holder of a conventional crystal puller by means of molybdenum wire. About ½ inch of the silicon nitride plate extended beyond the end of the silicon seed so that the end of the seed provided a nucleation site from which a silicon sheet could be propagated.

A body of silicon was placed in a crucible under the sample holder, and both the crucible and the sample were enclosed in an atmosphere of 96% argon and 4% hydrogen at a slight positive pressure. Next, the silicon in the crucible was completely melted by induction heating, and the silicon nitride plate was lowered into the melt until the lower end of the silicon seed touched the melt surface. The temperature of the melt was then adjusted until a silicon crystal was propagated from the end of the seed without freezing the melt surface. The nitride plate and the seed were then withdrawn from the melt at a pull rate of about 2.5 inches/minute, thus drawing a thin molten silicon sheet over and in contact with a portion of the smooth plate surface below the seed. The molten silicon did not adhere to the smooth surfaces of the nitride plate, but as the drawn silicon sheet solidified, it became firmly bonded to the silicon nitride plate. The resulting bond between the silicon sheet and the silicon nitride plate was so strong that attempts to break the two layers apart resulted in breaking away a portion of the nitride plate along with the silicon sheet.

The drawn silicon sheet was about 0.030 inch thick and varied from 0.160 to 0.235 inch in width. The silicon sheet was cross sectioned and stained with an etch-pit etch. The cross section was examined by optical photomicrographs, which showed the bulk of the sheet to be a single crystal with a few crystallites occurring in the silicon at the silicon-silicon nitride interface.

In another example of the invention, a slip cast flat plate of silicon nitride 0.040 inch thick, 0.170 inch wide, and 1.35 inches long and having a density of 70% of the theoretical density of silicon nitride was used as the substrate. One surface of the plate was treated in the same manner described in the example above, so that the plate could be dipped into and withdrawn from molten silicon at a temperature of 1425° C. without any silicon adhering to the smooth surface.

Two single crystal silicon seeds oriented in the (111) direction were mounted on opposite edges of the smooth substrate surface about ½ inch from the bottom end of the plate. The nitride plate was then lowered into a silicon melt under the same conditions described in the above example. The plate was withdrawn from the melt at a pull rate of 2.9 inches/hour, thus drawing a thin silicon sheet extending from the silicon seeds downwardly over the entire surface of the lower ½ inch of the smooth substrate surface. The molten silicon did not adhere to the smooth nitride surface, but as the drawn silicon sheet solidified, it became firmly bonded to the nitride plate. The resulting silicon sheet was 0.030 inch thick, and optical photomicrographs showed it to be composed of approximately six single crystals. The bond between the silicon sheet and the nitride substrate was so strong that attempts to break the two layers resulted in breaking away a portion of the substrate along with the silicon sheet.

While various specific forms of the present invention have been described herein in some detail, it will be apparent that the same are susceptible of numerous modifications within the scope of this invention. For example, the molten silicon sheet may be propagated from the nucleating site on the smooth substrate surface by advancing a layer of molten silicon over a stationary substrate rather than by dipping the substrate into a stationary silicon melt.

What is claimed is:

1. A process for producing a silicon sheet of relatively large silicon crystals bonded to a silicon nitride substrate, which process comprises:

(a) providing said silicon nitride substrate with a surface that is sufficiently smooth that molten silicon is non-adherent thereto;

(b) providing the smooth surface of said substrate with at least one nucleating site;

(c) contacting the smooth surface of said substrate and said nucleating site thereon with molten silicon so as to propagate a molten silicon sheet from said nucleating site over and in contact with the smooth surface of said substrate;

(d) and bonding said silicon sheet to said smooth surface of said substrate by freezing said sheet thereon.

2. The process of claim 1 wherein said smooth surface on said silicon nitride substrate is provided by slip casting said substrate.

3. The process of claim 1 wherein said smooth surface on said silicon nitride substrate is provided by etching said substrate surface.

4. The process of claim 1 wherein said molten silicon sheet is frozen on the smooth surface of said substrate by maintaining the atmosphere above said body of molten silicon at a temperature below the melting point of said silicon.

5. The product produced by the process of claim 1.

6. A process for producing a silicon sheet of relatively large silicon crystals bonded to a silicon nitride substrate, which process comprises:

(a) providing said silicon nitride substrate with a surface that is sufficiently smooth that molten silicon is non-adherent thereto;

(b) providing the smooth surface of said substrate with at least one nucleating site;

(c) forming a body of molten silicon;

(d) dipping said silicon nitride substrate into said molten silicon, and then withdrawing said substrate from the molten silicon so as to draw a molten silicon sheet extending from said nucleating site downwardly over and in contact with the smooth surface of said substrate;

(e) and bonding said silicon sheet to said smooth surface of said substrate by freezing said sheet thereon.

7. A process for producing a layer of monocrystalline silicon bonded to a silicon nitride substrate, which process comprises:

(a) providing said silicon nitride substrate with a surface that is sufficiently smooth that molten silicon is non-adherent thereto;

(b) providing a silicon seed crystal on the smooth surface of said substrate;

(c) forming a body of molten silicon;

(d) dipping said silicon nitride substrate into said molten silicon until said seed crystal contacts the molten silicon, and then withdrawing said substrate from the molten silicon so as to pull a molten silicon sheet extending from said seed crystal downwardly over and in contact with the smooth surface of said substrate;

(e) and bonding said silicon sheet to said smooth surface of said substrate by freezing said sheet thereon.

8. A process for producing a layer of monocrystalline silicon bonded to a silicon nitride substrate, which process comprises:

(a) providing said silicon nitride substrate with a surface that is sufficiently smooth that molten silicon is non-adherent thereto;

(b) mounting a pair of silicon dendrites on opposite edges of the smooth substrate surface;

(c) forming a body of molten silicon;

(d) dipping said silicon nitride substrate and the ends of said dendrites into said molten silicon, adjusting the temperature of said molten silicon until silicon crystals are propagated from the ends of said dendrites without freezing said molten silicon, and then withdrawing said substrate from the molten silicon so as to pull a molten silicon sheet extending between said dendrites and downwardly over and in contact with the smooth surface of said substrate;

(e) and bonding said silicon sheet to said smooth surface of said substrate by freezing said sheet thereon.

References Cited

UNITED STATES PATENTS 2,823,102 2/1958 Selker et al. ------ 23—223.5 X
3,129,061 4/1964 Dermatis ---------- 23—301 X

FOREIGN PATENTS 562,066 8/1958 Canada.

ALFRED L. LEAVITT, *Primary Examiner.*

WILLIAM L. JARVIS, RALPH S. KENDALL, *Examiners.*